United States Patent [19]

Premiski et al.

[11] Patent Number: 4,759,234
[45] Date of Patent: Jul. 26, 1988

[54] AUTOMATIC TRANSMISSION BEARING FOR SUPPORTING AXIAL AND RADIAL LOADS

[75] Inventors: Vladimir Premiski; Claudia Premiski, both of Bam-Willerscheid, Fed. Rep. of Germany

[73] Assignee: Ford Motor Company, Dearborn, Mich.

[21] Appl. No.: 19,105

[22] Filed: Feb. 26, 1987

[30] Foreign Application Priority Data

Mar. 14, 1986 [DE] Fed. Rep. of Germany ....... 3608507

[51] Int. Cl.⁴ ............................................. F16H 57/10
[52] U.S. Cl. ......................................... 74/764; 74/785; 74/789; 384/905.1
[58] Field of Search .................... 74/750 R, 753, 762, 74/763, 764, 765, 770, 785, 786, 787, 789, 790, 791; 384/901, 905.1, 420, 275, 276, 107

[56] References Cited

U.S. PATENT DOCUMENTS

| | | | |
|---|---|---|---|
| 1,817,891 | 8/1931 | Claus | 384/905.1 X |
| 2,755,688 | 7/1956 | Swennes | 74/762 X |
| 3,234,820 | 2/1966 | Tuck et al. | 74/765 X |
| 3,418,871 | 12/1968 | Cartwright et al. | 74/763 |
| 3,470,770 | 10/1969 | Fisher | 74/763 X |
| 4,304,153 | 12/1981 | Moroto et al. | 74/765 X |
| 4,325,593 | 4/1982 | Mallet | 384/905.1 X |

Primary Examiner—Leslie A. Braun
Assistant Examiner—Dwight G. Diehl
Attorney, Agent, or Firm—Donald J. Harrington; Keith L. Zerschling

[57] ABSTRACT

A compound radial and axial bearing for automatic transmissions for motor vehicles having a sleeve portion with bearing surfaces on both sides for radial loads and a collar portion with bearing surfaces on both sides for axial loads, the sleeve portion (22 and 32) being provided with an internal collar (26 and 36) for receiving axial loads and a further external collar (27 and 37) for receiving a further axial load.

4 Claims, 4 Drawing Sheets

AUTOMATIC TRANSMISSION BEARING FOR SUPPORTING AXIAL AND RADIAL LOADS

BACKGROUND OF THE INVENTION

The invention comprises a bearing for the gearing of an automatic transmission for motor vehicles.

An example of an automatic transmission having gearing capable of being supported by the bearing of our invention is disclosed in German Offenlegungsschrift (Laid-Open Specification) No. 34 17 703. That reference discloses a complex arrangement of thrust washers between a component connected to the central shaft and components connected to the driven shaft and the gearing.

The transmission of the reference German specification is designed for a specific torque capacity, which makes it possible to produce the front planet carrier of a Simpson-type gear system inexpensively as an aluminum casting, while the hub of the ring gear is produced from steel. This results in an advantageious matching of material, which allows the steel ring gear hub to run on the aluminum planet gear carrier. In order to support the steel ring gear hub axially, a thrust washer is secured to the aluminum planet gear carrier by means of a snap ring. The aluminum planet carrier is supported by means of a thrust washer that is prevented from rotating and that is mounted in a conventional manner on a forward and direct drive clutch connected to a central torque input shaft.

Compound bearings with sleeve portions having sliding surfaces on both sides for radial loads and having a collar portion for axial loads on both sides are shown in German Offenlegungsschriften Nos. 14 25 284 and 16 25 626.

GENERAL DESCRIPTION OF THE INVENTION

The object of the invention is to provide a simplified bearing arrangement for an automatic transmission for motor vehicles in which, for reasons of torque capacity, the front planet carrier of a Simpson-type planetary gear system is made from steel and consequently the ring gear hub must be supported by means of a radial bearing. This is accomplished by a compound bearing capable of supporting both axial and radial loads. The bearing includes a sleeve portion for supporting concentric shafts and a pair of collar portions for supporting axial loads.

By virtue of the fact that the sleeve portion comprises a collar angled inwards for receiving axial loads and a further collar angled outwards for receiving a further axial load, the bearing sleeve portion used for the radial loads can simultaneously take on the function of the two axial thrust bearings that otherwise would be necessary if the prior art teachings were to be followed.

The sleeve portion is formed in a known manner by deep drawing from a plate consisting of a support sheet provided on both sides with a layer of bearing material so as to form an internal collar sleeve. The sleeve then is formed with outwardly projecting radial collars by stamping and bending.

The sleeve portion may also be formed in known manner by deep drawing from a plate of bearing material, such as bronze, for example, to form an internal collar sleeve. The sleeve is subsequently provided with annular collars pressed outwards by axial upsetting. The desired axial loading function thus can be achieved.

DESCRIPTION OF THE DRAWINGS

The invention is described in greater detail with reference to two embodiments illustrated in the accompanying drawing as follows.

PARTICULAR DESCRIPTION OF THE INVENTION

Figure 1:
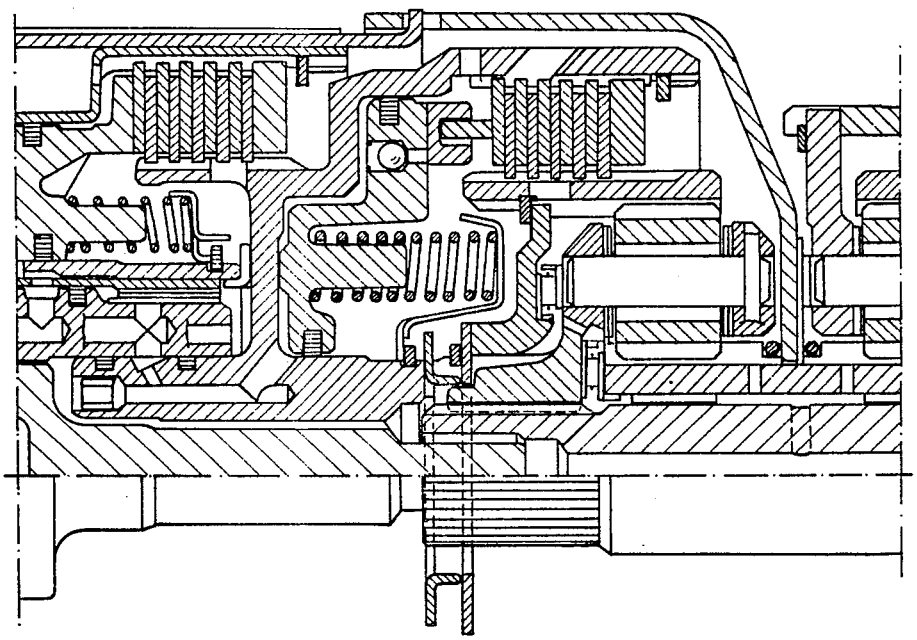
FIG. 1 is a partial section through a prior art automatic transmission with a known bearing arrangement.

FIG. 1 shows a bearing arrangement in a Simpson-type planetary gear system for an automatic transmission for a motor vehicle. This is an illustration of the present state of the art. An advantageous matching of materials (e.g., steel and aluminum) is used. For example, the front planet carrier is produced from aluminum and the ring gear hub is produced from steel. As a result, it has been possible to dispense with the arrangement of a bearing sleeve between the ring gear hub and the carrier. A thrust washer of conventional type secured by a circlip is provided to support the ring gear hub axially. A conventional thrust washer with an angled tongue is provided at the end of the hub of the planet carrier to prevent rotation.

Figure 2:
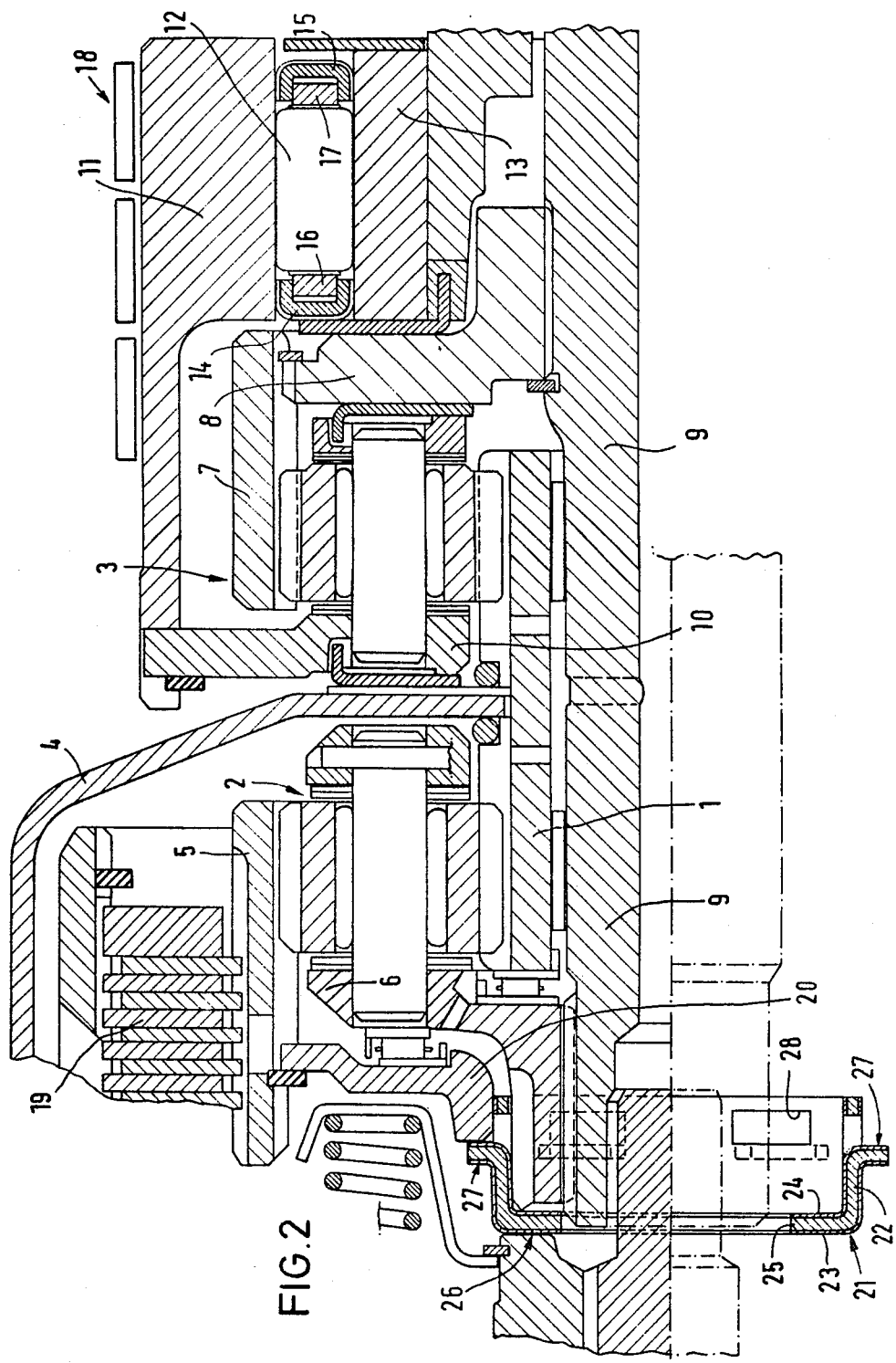
FIG. 2 is a vertical partial section through a Simpson-type planetary gear system of an automatic transmission with a bearing arrangement according to the invention.
Figure 3:
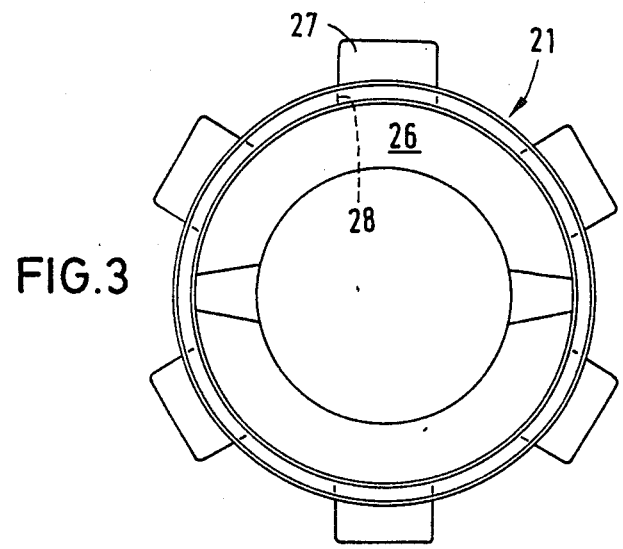
FIG. 3 is an axial view of the radial and axial bearing in FIG. 2.
Figure 5:
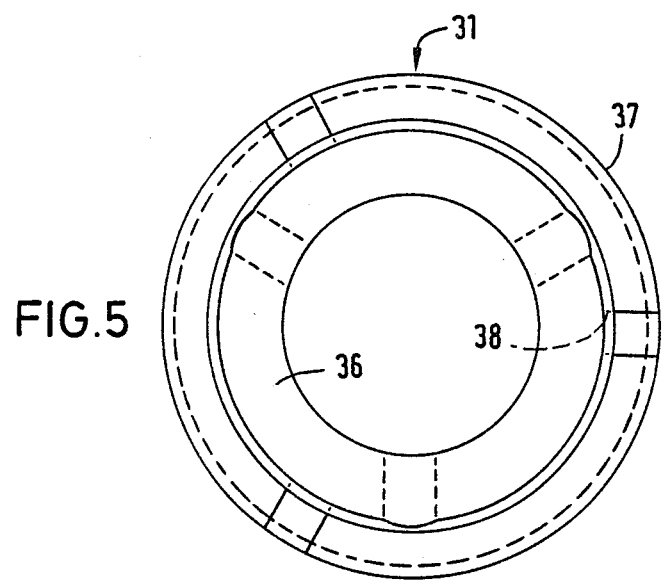
FIG. 5 is an axial view of the radial and axial bearing in FIG. 4.

A Simpson-type planetary gear system frequently used in automatic transmissions of motor vehicles is shown also in FIG. 2. It comprises a common sun gear 1 for a front planetary gear set 2 and a rear planetary gear unit 3. The common sun gear can be acted upon with torque from a forward drive clutch (not shown) by way of a driving shell 4. A ring gear 5 can be acted upon with torque by way of a direct drive clutch 19. The planetary gear carrier 6 of the front planetary gear unit 2 is connected to a driven shaft 9 by means of a spline, and the ring gear 7 of the rear planetary gear unit 3 is connected to the driven shaft 9 by means of ring gear hub 8 and by means of a spline. A rear planet gear carrier 10 is connected drivably to a cup-shaped component 11 which forms the outer race of an overrunning clutch 12, the inner race 13 of which is secured in the transmission casing (indicated only).

Support rings 14 and 15, which are C-shaped and reinforced by means of retaining rings 16 and 17, are disposed on both sides of the overrunning clutch 12. The cup-shaped component 11 is surrounded by brake band 18 which can exert considerable force upon it. The component 11 is mounted concentrically and prevented from tilting by the support rings 14 and 15.

The clutch discs of direct-drive clutch 19, by means of which driving torque is transmitted in certain operating states, engage the ring gear 5 of the front planetary gear unit 2. A ring gear hub 20 is rotatably mounted on the hub of the planet gear carrier 6 by means of a radial and axial bearing 21 in accordance with the invention.

The radial and axial bearing illustrated in FIG. 2 comprises a sleeve portion 22 formed in known manner by deep drawing from a plate consisting of a support sheet 25. Provided on both sides are surfaces of low friction bearing material 23 and 24, respectively. The deep drawing operation forms a sleeve portion with an internal collar 26. Sleeve portion 22 also is formed with external collar 27 from a plurality of radial lugs by outward stamping and bending.

The openings 28 produced in the sleeve portion 22 when pressing out the radial lugs of collar 27 serve as ports for distributing lubricating oil into the region of the sleeve portion 22 in an advantagious manner.

Figure 4:
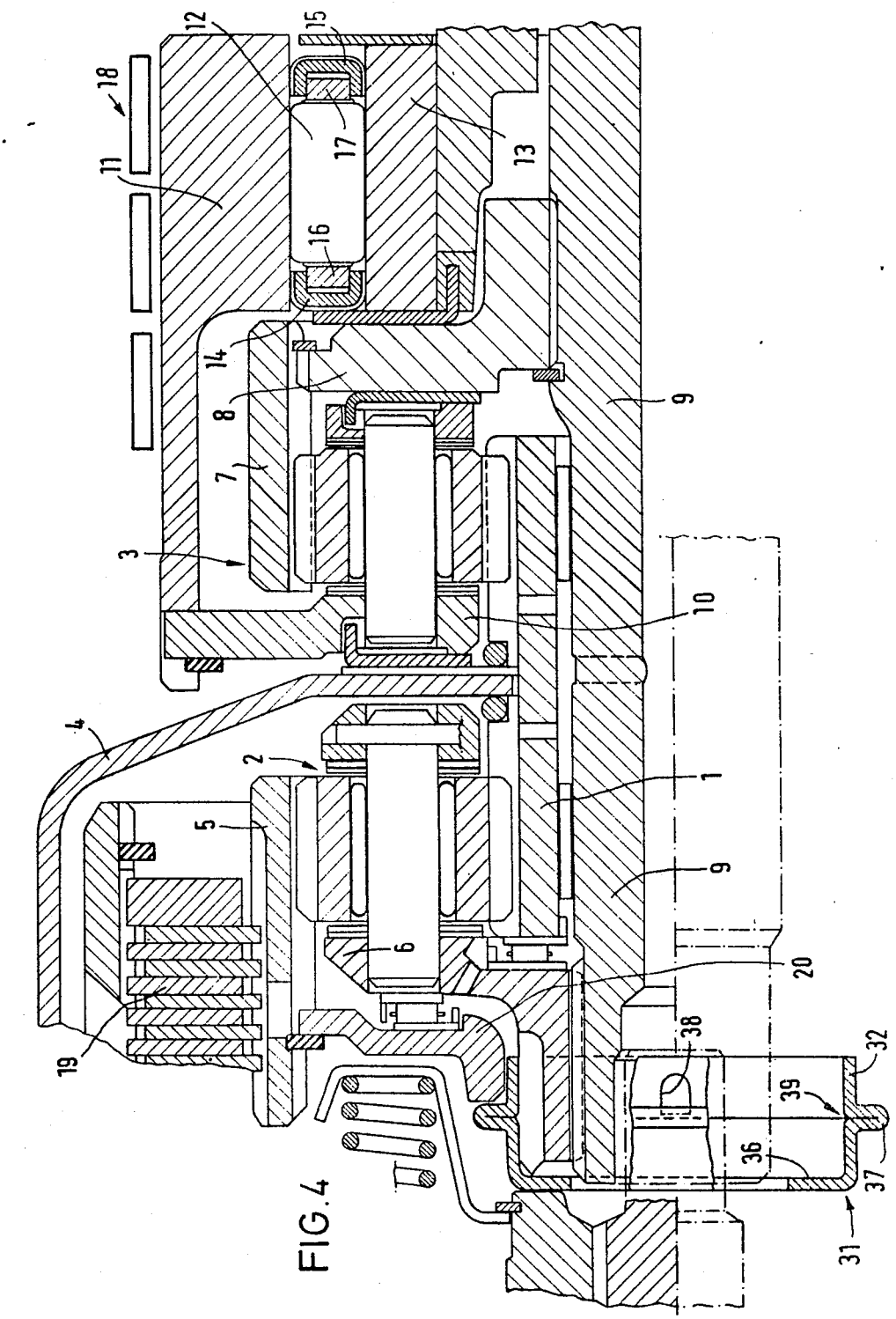
FIG. 4 is a vertical partial section similar to FIG. 2 showing an additional embodiment of the radial and axial bearing according to the invention.

FIG. 4 shows a further embodiment of a radial and axial bearing 31 according to the invention. The sleeve portion 32 of bearing 31 is formed in known manner by deep drawing from a plate of bearing material, such as bronze for example, so as to form a sleeve with an internal collar 36. The sleeve portion 32 then is provided with an annular rib 37 pressed outwards by subsequent axial upsetting. This serves as an external bearing collar. Openings 38, which again ensure an adequate supply of lubricating oil to both sides of the sleeve portino 32, are provided at points distributed over the periphery of sleeve portion 32.

The openings 38 are connected to a circular space 39 produced by the axial upsetting of the annular rib 37, so as to ensure lubrication in all radial positions of the radial and axial bearing with respect to the planet carrier 6.

Because of the design of the compound radial and axial bearing in accordance with the invention, the axial support of the front planet carrier 6 with respect to the adjacent central shaft as well as the radial and axial support of the ring gear hub 20 can be achieved with a single component.

In both embodiments the manufacture of the compound radial and axial bearing is relatively simple since a conventional deep drawing procedure is subsequently followed by either a stamping and bending procedure or by an upsetting procedure. In both cases a trouble-free bearing in this critical region of an automatic transmission can be achieved with modest manufacturing cost.

Having described preferred embodiments of the invention, what we claim is:

1. In a planetary gear assembly for an automatic transmission having a central torque input shaft and a coaxial output shaft, a planetary gear unit having a sun gear and a ring gear, a planetary carrier with a hub connected to said output shaft and planet gears on said carrier engaging said sun and ring gears;

a unitary, compound bearing having a sleeve portion surrounding said carrier hub, said ring gear having a hub supported on said sleeve portion;

a first collar extending radially inward from said sleeve portion and located between adjacent ends of said torque input shaft and said carrier hub; and a second collar extending radially outward from said sleeve portion and located adjacent said ring gear hub whereby axial bearing loads are distributed radial bearing loads are distributed by said sleeve portion to said input shaft and said output shaft;

said sleeve portion and both collars having a bearing surface on each side thereof.

2. The combination as set forth in claim 1 wherein said first collar is formed by cutting and bending tabs from one axial end of the sleeve material and said second collar is formed by cutting and bending tabs from the sleeve material near the other end thereof, the forming of said tabs near the other sleeve end providing lubrication oil passages for distributing lubrication oil to the surfaces of said bearing.

3. The combination as set forth in claim 1 wherein said second collar is formed by upsetting said sleeve in an axial direction to form a radial rib, the ring gear hub being adapted to engage said rib whereby axial bearing loads are transferred to said input shaft.

4. The combination as set forth in claim 3 wherein said rib forms an internal peripheral space adapted to distribute lubrication oil to the internal bearing surface of said sleeve, and openings in said sleeve adjacent said space for distributing lubrication oil between the inner and outer bearing surfaces of said sleeve.

* * * * *